United States Patent [19]

Houvig et al.

[11] Patent Number: 4,520,488
[45] Date of Patent: May 28, 1985

[54] COMMUNICATION SYSTEM AND METHOD

[75] Inventors: Felix J. Houvig, Wayne; Ronald H. Rowlands, Collegeville, both of Pa.

[73] Assignee: Honeywell, Inc., Minneapolis, Minn.

[21] Appl. No.: 317,083

[22] Filed: Nov. 2, 1981

Related U.S. Application Data

[63] Continuation-in-part of Ser. No. 239,244, Mar. 2, 1981, abandoned.

[51] Int. Cl.³ .............................................. H04B 3/60
[52] U.S. Cl. ................................... 375/5; 340/310 R; 307/2; 375/7; 375/24; 375/36; 178/63 R
[58] Field of Search ................. 178/63 R, 63 B, 63 C; 179/3, 4, 2 DP, 2 R; 370/9, 37; 375/22, 36, 7, 5, 24; 340/870.01, 870.13, 870.3, 870.39, 310 R, 310 A, 870.18, 870.19, 870.21, 870.24, 870.38, 870.39; 307/2

[56] References Cited

U.S. PATENT DOCUMENTS

| | | | |
|---|---|---|---|
| 1,194,142 | 8/1916 | Claus | 375/5 |
| 1,806,754 | 5/1931 | Gilbert | 178/63 B |
| 3,178,515 | 4/1965 | Bramer et al. | 370/37 |
| 3,922,490 | 11/1975 | Pettis | 340/870.38 |
| 4,264,963 | 4/1981 | Leach | 340/310 A |
| 4,272,758 | 6/1981 | Giraud | 340/310 R |
| 4,316,262 | 2/1982 | Mizuta et al. | 340/310 A |
| 4,341,927 | 7/1982 | Shinoi et al. | 178/63 R |
| 4,399,440 | 8/1983 | Douglas | 340/870.38 |
| 4,422,073 | 12/1983 | Winner | 340/310 R |
| 4,463,340 | 7/1984 | Adkins et al. | 340/310 A |

OTHER PUBLICATIONS

EDN, Apr. 1, 1981, pp. 268 and 270.
IEEE Transaction on Industry Applications, vol. 1A-12, No. 4, Jul./Aug., 1976, pp. 378 to 386.
Second International Symposium on Subscriber Loops and Services, May 3-7, 1976, Institution of Electrical Engineers, pp. 92 to 95.
Advances in Instrumentation, vol. 29, No. 4, 1974, p. 801, parts 1 to 5.
Patent Abstracts of Japan, vol. 6, No. 91, May 28, 1982, p. E 109,969, Appln. 55-98936, Filed 7-19-80, Y. Hiramatsu.

Primary Examiner—Benedict V. Safourek
Attorney, Agent, or Firm—Mitchell J. Halista; Trevor B. Joike

[57] ABSTRACT

A communication system for communicating analog and digital data with a process variable, e.g., pressure, transmitter over the two wires which supply power to the transmitter apparatus. The digital communication operation is half-duplex, bit serial transmission and is represented by the currents and voltages in the transmitter communication loop which are selectively introduced between process variable analog data transmissions of 4-20 ma. A plurality of bit cells are provided for each data word or byte between a start bit and a parity bit cell. Following the completion of transmission of the digital data, a predetermined time period is introduced to enable the resumption of transmission of process variable data. Multiple byte digital data transmission can also be effected between process variable analog transmissions by having a byte spacing less than the predetermined time period preceeding the 4-20 ma process variable transmissions. Thus, this method of communication provides for selective alternate digital and analog communications with the digital communications being achieved by variations of the current in the communication loop between the 4-20 ma limits, while the analog data is represented by a corresponding direct current magnitude between the 4-20 ma limits. Consequently, the variation of the loop current in a first format produces a digital communication capability while the variation of the loop current in a second format produces an analog data communication capability.

20 Claims, 11 Drawing Figures

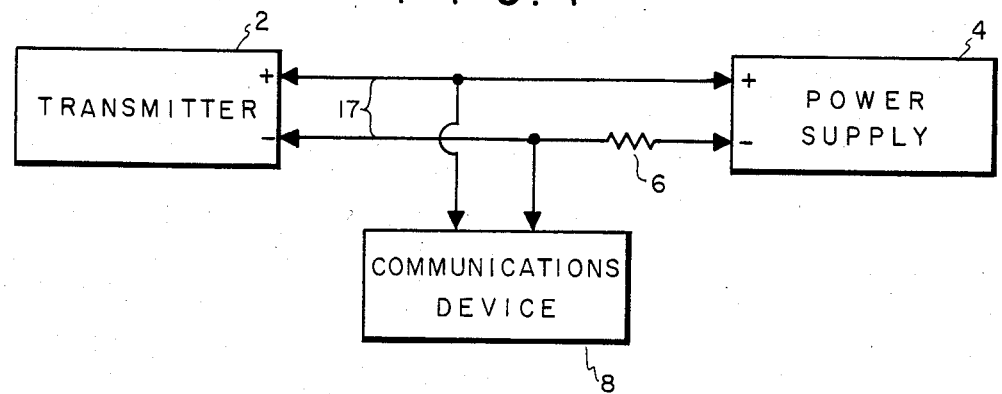
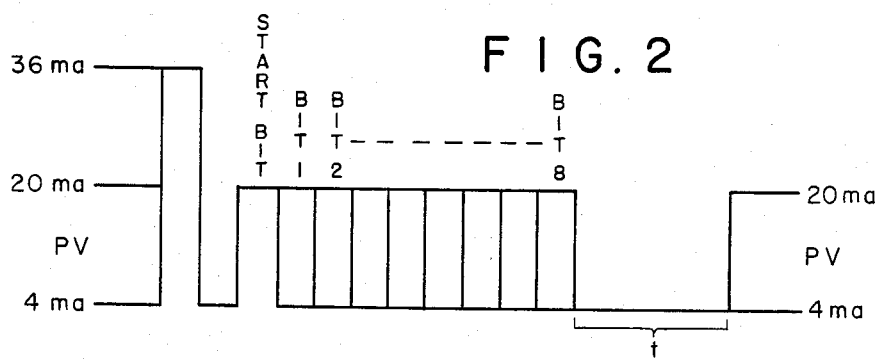
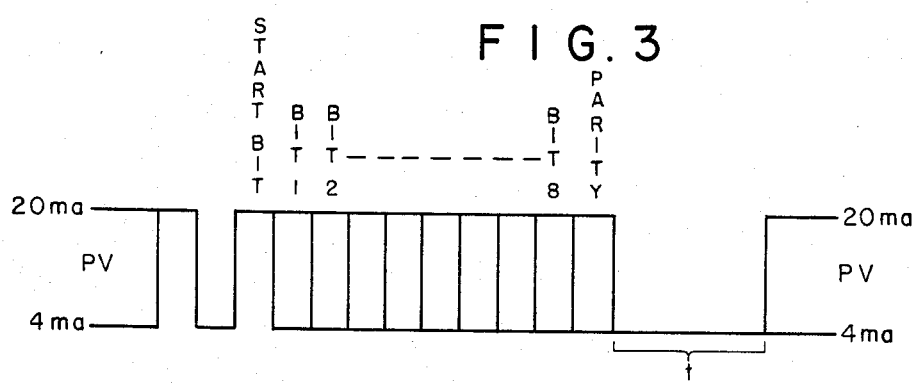
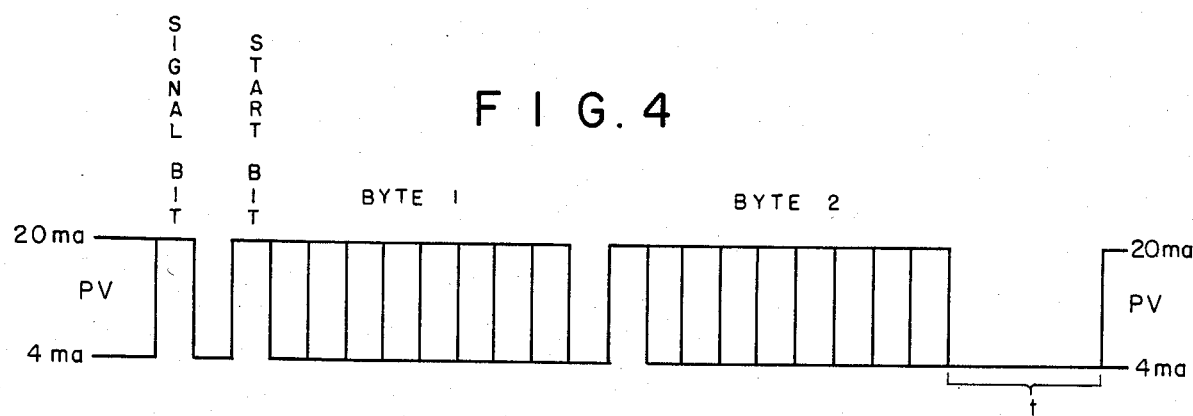

4,520,488

COMMUNICATION SYSTEM AND METHOD

This is a continuation-in-part of application Ser. No. 6/239,244, filed on Mar. 2, 1981, now abandoned.

BACKGROUND OF THE INVENTION

Field Of The Invention

The present invention is directed to data communication systems. More specifically, the present invention is directed to a combined analog and digital data communication system utilizing power supply circuits.

SUMMARY OF THE INVENTION

An object of the present invention is to provide an improved data communication system for providing either analog or digital data transmission over power supply circuits.

In accomplishing this and other objects, there has been provided, in accordance with the present invention, a data communication system between a transmitter and a communication device utilizing a resistor in the power transmitting circuit for developing a voltage drop. Selective digital communication is achieved by either the transmitter or the communication device by forcing the power circuit current through the resistor to change rapidly between preset limits. Each change between the limits is used to carry a digital bit of serial digital information in the circuit which bit is represented by a voltage change produced by a voltage drop across the resistor. Analog data transmission is effected by a power circuit current level representing an analog value between digital communication.

Accordingly, the method of communication includes the steps of introducing into a direct current power supply circuit first direct current variations having values representative of corresponding analog data, terminating the first current variations, introducing second direct current variations into the power supply circuit between pre-set current limits with each variation representing a digital bit. Additionally, the method can include the further steps of terminating the second current variations by introducing a pre-set communication gap represented by the duration of a pre-set current level and an additional step of reinstating the first current variations following the termination of the pre-set current level.

BRIEF DESCRIPTION OF THE DRAWINGS

A better understanding of the present invention may be had when the following detailed description is read in connection with the accompanying drawings, in which:

FIG. 1 is a simplified block diagram of a communication system embodying an example of the present invention.

FIG. 2 is a waveshape diagram of a first communication format utilized in the circuit of FIG. 1, FIG. 3 is a waveshape diagram of a second communication format utilized in the circuit shown in FIG. 1, FIG. 4 is a waveshape diagram of multi-byte communication format for the circuit shown in FIG. 1.

DESCRIPTION OF THE PREFERRED EMBODIMENT

Figure 5:
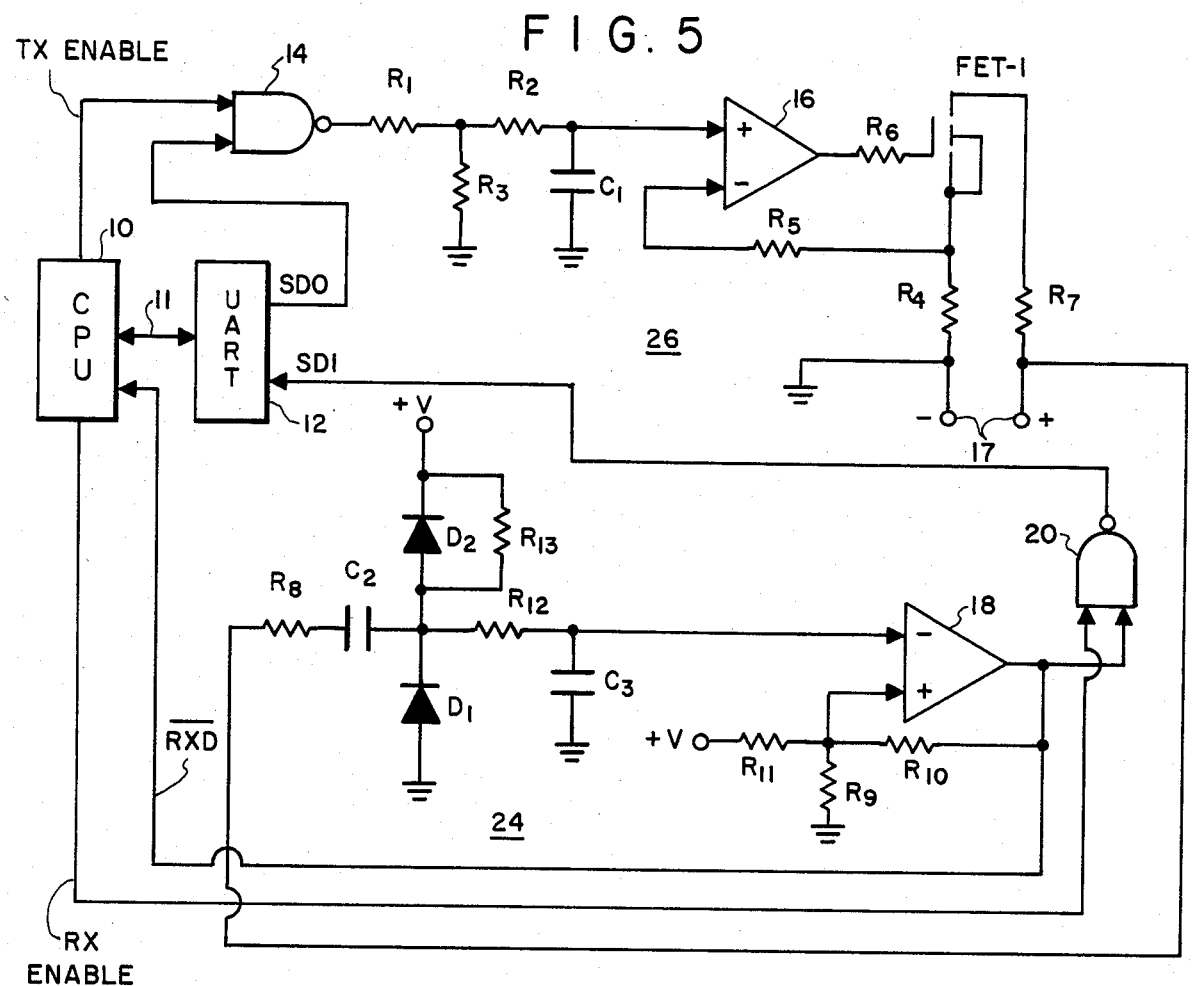
FIG. 5 is a schematic diagram of a circuit suitable for use in the communication device of FIG. 1.

Referring to FIG. 1 in more detail, there is shown a simplified block diagram of a communication circuit embodying an example of the present invention. A process variable transmitter 2 is powered from a direct current power supply 4 through a resistor 6. A communication device 8 is connected across the power supply lines. The connection of the communication device 8 may be effected at any point along the power supply lines 17 which affords a maximum utility to the communication device 8 since it can be a hand held device having the circuits, data entry keyboard and display thereon, as discussed hereinafter and shown in FIG. 9. This system provides a means for enabling the communication device 8 to communicate with the transmitter 2, e.g., a pressure transmitter monitoring pressure in a pipeline, over the two wires which supply power to the transmitter 2. The communication operation is half-duplex, bit serial transmission and is carried by the currents and voltages present in the transmitter loop. The loop circuit resistor 6 has a value of at least 250 ohms and is in series with the communication loop. Normally, the process variable (PV) being monitored by the transmitter, e.g., pressure, produces an analog signal by means of direct currents in the communication loop in a predetermined range, e.g., 4–20 ma. representing process variable analog values. Such 4–20 ma. analog signals are monitored by conventional so-called two-wire data receivers which respond to the current supplied from the power supply 4 to produce an output representative of the value of the process variable as defined by the 4–20 ma. current signal, such devices being well-known in the art as shown in U.S. Pat. No. 3,562,729 and as discussed hereinafter with respect to FIG. 11. This PV signal is disturbed or altered during digital data communication to provide the digital bit transmission. The digital data communication is accomplished by forcing the loop current to change rapidly between the preset limits, e.g., 4 ma. and 20 ma. This change of the loop current carries the serial digital bit information.

The communication device during the communication operation accepts or "sinks" 16 ma. from the loop for a logical "0" and 0 ma. from the loop for a logical "1". The transmitter 2 senses this current variation as a drop in voltage across its input/output terminals. This voltage drop occurs because the 16 ma. drawn by the communication device 8 causes a four volt drop across the resistor 6 in series with the current loop. This voltage drop decreases the voltage across the input/output terminals of the transmitter 6 by four volts. By the use of bandpass filters, the transmitter 2 is sensitive only a voltage variations more rapid than those allowed in analog signal transmissions, i.e., the transmitter 2 sends analog and digital signals but receives only digital signals.

When the communication device 8 initiates communication with the transmitter 2, the process variable (PV) current can be anywhere in the range of 4 to 20 ma. The communication device draws an additional 16 ma. from the loop making the total loop current in the range of 20 to 36 ma. This occurs for only one digital bit time and is used to signal to the transmitter 2 that communication with the transmitter 2 has been initiated. The voltage at the transmitter input terminal will drop by four volts which represents the voltage drop across the resistor 6. When the transmitter 2 senses the drop in voltage at its input/output terminals, it waits for one bit time and then drops its own current drain from the former process variable level to a new level of 4 ma. This current drop is matched by a concurrent drop in current drain by the communication device 8 from 16 ma. to 0 ma. Total loop current then drops from the range of 20 to 36 ma. down to 4 ma. The transmitter 2 maintains its current drain of 4 ma. until the communication operation is finished. Loop current is varied for each digital bit including the "start" and parity bits from 4 ma. to 20 ma. by the communication device 8. This variation in current is sensed by the transmitter 2 as a drop in voltage across its input/output terminals whereby each digital bit is sensed. When the communication from the communications device 8 to the transmitter 2 is finished, indicated by steady loop current of 4 ma. for a predefined time period (t), the transmitter adjusts its current drain back to the former process variable (PV) level within the range of 4 to 20 ma. This communication format is shown in FIG. 2.

When the digital communication operation occurs from the (PV) transmitter 2 to the communication device 8, the transmitter 2 forces its current drain to increase from the process variable level, e.g., the range of 4 to 20 ma. to 20 ma. It holds this current level for one bit time, then drops the current level to 4 ma. This latter level is also held for one bit time after which the information transmission starts with a "start" bit. Digital communication from the transmitter 2 to the communication device 8 continues with the loop current being varied by the transmitter 2 between 4 ma. and 20 ma. for each digital bit until the communication operation is completed. Completion of the communication operation occurs when the loop current is held steady at 4 ma. for a predefined time period (t) after which the transmitter 2 adjusts the loop current back to the former process variable level, e.g., the range of 4 to 20 ma. This communication format is shown in FIG. 3.

The time between before the start bit period as shown in FIGS. 2 and 3 is a "signalling bit" which precedes the normal process variable transmission format of a "start bit", 8 data bits, parity bit and stop bit as shown in the communication waveshape format of FIGS. 2 and 3. This "signalling bit" is used only at the beginning of a transmission in either direction. If a particular transmission requires more than one byte of data, the bytes are transmitted one immediately after the next without a time delay (t) therebetween until the communication operation is completed as shown in FIG. 4 for the communication operation between the transmitter 2 and the communication device 8.

In FIG. 5, there is shown a circuit schematic for the implementation of the communication link in the communication device 8. There are three basic sections in the circuit shown in FIG. 5, the communications controller which includes a microprocessor, i.e., CPU 10 and its associated circuits connected by a digital signal line 11 to a parallel to serial converter and timing circuit or universal asynchronous receiver transmitter (UART) 12, a current driver circuit 26 consisting of an attenuator/filler, a voltage modulated current source including an operational amplifier and a power output transistor and a current receiver circuit 24 consisting of an input protection network, a filter and a comparator. The CPU's discussed herein for use in the transmitter 2 and communication device 8 may include a conventional microprocessor having program and data memories. The reading of stored data, the storing of incoming data, the use of stored programs or algorithms in the microprocessor memory, the use of address and data busses and the operation of logic circuits in the CPU are conventional digital computer techniques performed by known CPU or microprocessor products. Further, the writing of programs or routines including microprogram and branching routines for directing the CPU operation to achieve desired CPU functions to provide output signals for associated hardware systems is also well-known in the art. Accordingly, further elaboration of the details of these known techniques beyond the discussion herein is believed to be unnecessary for a full understanding of the present invention.

The CPU 10 has a "Tx Enable" output applied as one input to a two input NAND gate 14. A second input for the NAND gate 14 is obtained from the SDO (Serial data out) output of the UART 12.

The output of the NAND gate is applied through a resistor network $R_1$ $R_2$ and $R_3$ to the non-inverting input of a first operational amplifier 16 and to one side of a first capacitor $C_1$ having its other side connected to ground. A feedback signal resistor $R_5$ is connected at one end to the inverting input of the amplifier 16. The output of the first amplifier 16 is connected through a resistor $R_6$ to the gate electrode of a field-effect transistor (FET 1). One electrode of the FET 1 is connected through a resistor $R_4$ to the output terminals 17 while the other electrode of the FET 1 is connected through a resistor $R_7$ to the other one of the output terminals 17.

Figure 8:
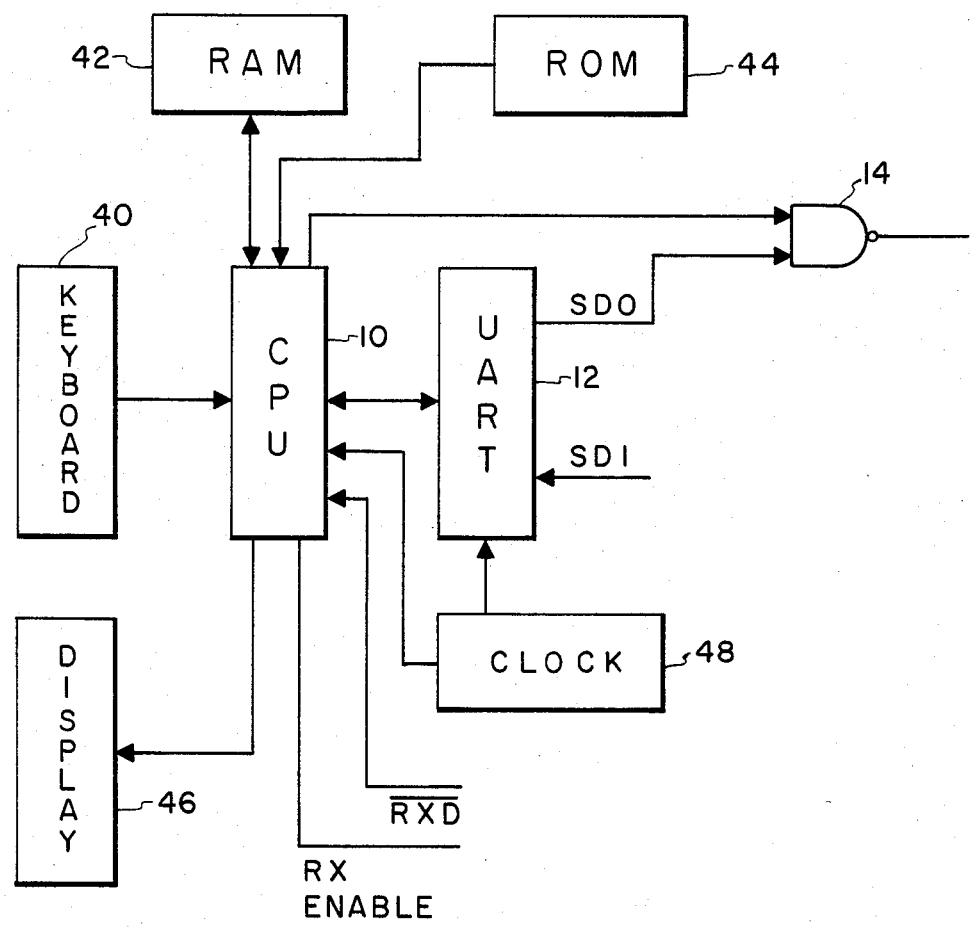
FIG. 8 is an expanded block diagram of a portion of FIG. 5.

Additionally one of the output terminals 17 is connected to ground while the other one is connected through a filter circuit including a resistor $R_8$ and a capacitor $C_2$ to circuit node between a pair of oppositely poled diodes $D_1$ and $D_2$. The other sides of the diodes $D_1$ and $D_2$ are connected to ground and to a positive source, +V, respectively. The circuit node between the diodes $D_1$, $D_2$ is connected through a resistor $R_{12}$ to the inverting input of a second operational amplifier 18 and through a resistor $R_{13}$ to the positive source +V. The non-inverting input of the amplifier 18 is connected to its output through a feedback network of resistor $R_9$ and $R_{10}$ while a resistor $R_{11}$ connects the input to a source +V and forms a voltage divider with $R_9$ across the source +V. The output of the amplifier 18 is also connected as a second input to the NAND gate 20 and as an input to the CPU 10 as an $\overline{RXD}$ signal. The first input of the NAND gate 20 is connected to the CPU 10 to receive an "RX enable" input. The output of the NAND gate 20 supplies an SDI (Serial Data In) input to the UART 12. It should be noted that for purposes of simplifying the illustration of FIG. 5, digital memory elements for the CPU 10, external CPU inputs, synchronizing clock signals for the CPU and UART 12 and digital displays for the CPU 10 have been omitted. While such operational details are well-known to those skilled in the art and their specific inclusion is believed to be unnecessary for a complete understanding of the present invention, a more complete block diagram is shown in FIG. 8.

Figure 6:
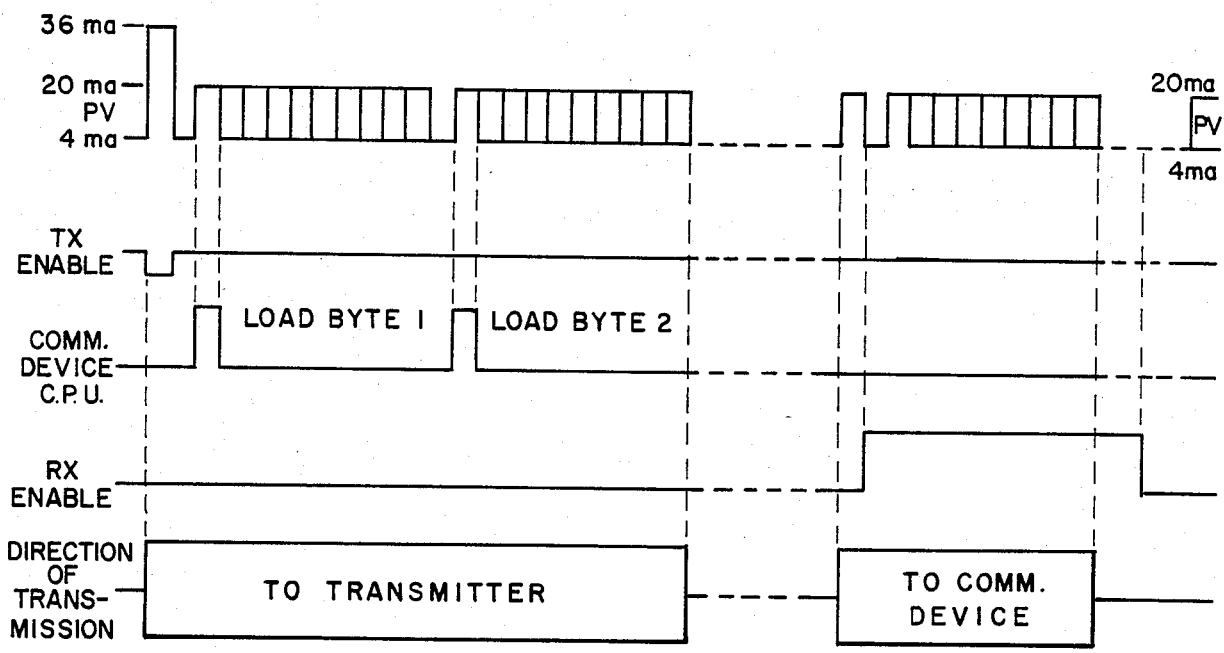
FIG. 6 is a communication device driver/receiver timing diagram.

The driver circuit 26 operates by utilizing the "signaling bit" which is generated directly by the preprogrammed microprocessor CPU 10 by using the "TX enable" output signal. This CPU output signal is set to a logical "0" which is summed by the NAND gate 14 with the "SDO" output signal from the U.A.R.T. 12 to generate a logic 1 at the output of the NAND gate 14. This output signal, in turn, causes the operational amplifier 16 to adjust the current flowing through the FET 1 so that the voltage drop across the resistor R4 is equal to 2/5 of the voltage at the gate 14 output, e.g., about 2 volts. This operation results in a current flow of about 16 ma. through the FET 1. This current is drawn directly from the transmitter loop current and is seen by the transmitter as a drop in voltage across its terminals as previously described. The microprocessor then sets the "TX enable" signal to a logic 1 level which causes the current in the current loop to decrease as the current flowing through the FET 1 drops to zero. The microprocessor 10 then loads the first byte to be transmitted into the U.A.R.T. 12 which converts the byte to serial digital data, appends a start, parity and stop bits and transmits the serial bits via the "SDO" output to the NAND gate 14. This signal transmission ultimately causes the communication loop current, by means of the FET 1 to vary as shown in FIG. 6. The variation of the loop current is effected for each bit of serial information being transmitted to the transmitter 2 until the microprocessor 10 reaches the end of its data store.

Since the communication is controlled by the communication device 8 once the communication device 8 has started a transmission it expects to always detect a response. Once the communication from the communication device 8 to the transmitter 2 is completed, the microprocessor 10 in the communication device 8 monitors the "$\overline{RXD}$" signal from the receiver circuit 24. Specifically, the microprocessor 10 detects the transition from 20 ma. to 4 ma. which occurs after the initial change from 4 ma. to 20 ma. The microprocessor 10, then, is alerted to the fact that the one bit time later the "start" bit will be supplied and the microprocessor 10 can proceed to enable the receiver 24 by setting the RXD enable bit to a logical 1. This signal is combined by the NAND gate 20 with the $\overline{RXD}$ signal from the receiver 24 to generate the correct logic level and polarity for the "SDI" input at the UART 12. The start bit is then received from the transmitter 2 and transmission of the digital data from the transmitter 2 commences. After the parity bit is transmitted, the communication is completed at a "Stop" bit wherein the loop current is reduced to 4 ma. The transmitter 2 after waiting for a present time "t" adjusts the loop current back to the applicable process variable current level to produce the normal 4 ma. to 20 ma process variable data signals for transmission from the transmitter 2. A timing diagram for the operation of the communication device 8 is shown in FIG. 6.

Figure 7:
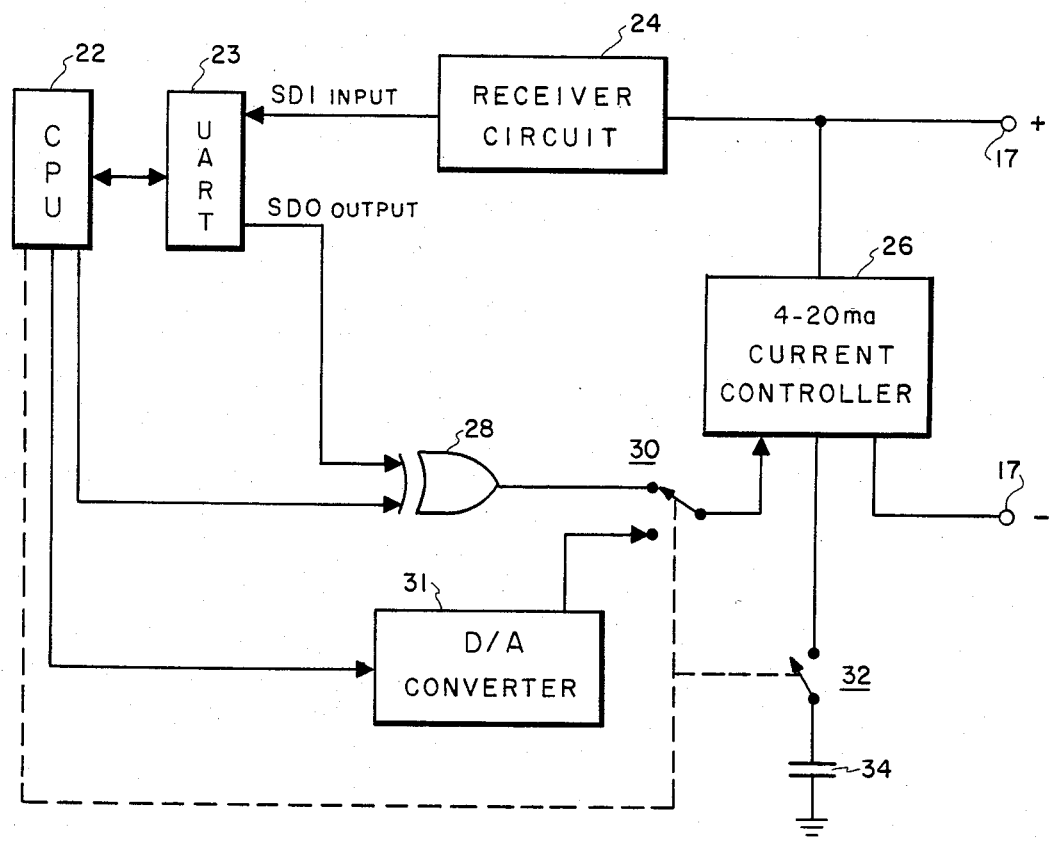
FIG. 7 is a block diagram of a transmitter circuit suitable for use in the present invention.
Figure 10:
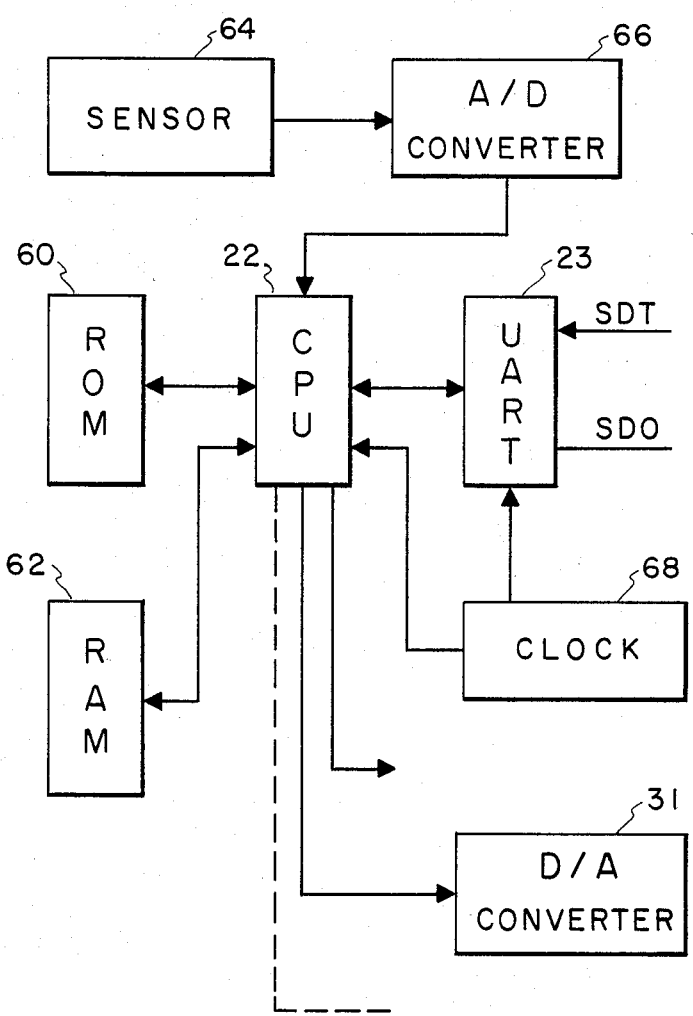
FIG. 10 is an expanded block diagram of a portion of FIG. 7.

A block diagram for the transmitter driver/receiver circuits is shown in FIG. 7. The receiver section 24 for the transmitter 2 is a similar circuit to the receiver 24 found in the communication device 8 and functions in a similar manner. The driver section for the transmitter 2 is an addition to the 4 to 20 ma. analog current (PV) controller 26 which is already present in the transmitter system in a conventional fashion to control the process variable output current. To make this current function as a digital signal transmitter, the time constant of the output circuit is altered by the switching of a capacitor 34 by a switch 32. In other words, the process variable output is the average of a pulse-width modulated output of the D/A converter 31 as averaged by the output capacitor 34. To provide a rapid digital output variation, the output capacitor 34 is switched out of the circuit by switch 32 to allow high speed current changes. The switching is controlled by a CPU 22 in the transmitter 2 connected to a UART 23 having an SDO output and an SDI input. The SDI input is connected to a receiver circuit 24 arranged as mentioned above and used to receive the digital commuications from the communications device 8 and to disregard the output of a 4 to 20 ma. current controller 24 connected to the output terminals 17. The SDO output of the UART 23 is connected to one input of a two input exclusive OR gate 28. A second input for the NAND gate 28 is applied from the CPU 22. The output of the OR gate 28 is applied to one contact of a single pole, double throw switch 30. The other contact of the switch 30 is connected to the output of a D/A converter 31. The switch arm of the switch 30 is connected to a control input of the current controller 26. A second switch 32 which is a single pole, single switch, is used to connect the time constant capacitor 34 to the current controller 26. The switches 30 and 32 are concurrently operated by the CPU 22 for either analog (PV) or digital signal transmission by the transmitter 2. The block diagram illustration shown in FIG. 7 has, as in the case of FIG. 5, been simplified to omit conventional details such as external CPU inputs including a process variable sensor, CPU memory devices and clock signals for synchronizing the CPU 22 and UART 23. Such details are shown in FIG. 10 and discussed hereinafter although it is believed that their specific inclusion is unnecessary for a complete understanding of the present invention.

The control signal input to current controller 26 is switched from the D/A converter 31 output to the UART 23 SDO output signal by the CPU 22 for digital communication. In series with this SDO output signal is the exclusive OR gate 28 which allows for generation of a "signalling bit" under control of the microprocessor 22. The time constant capacitor 34 which is switched out for digital communications by the switch 32, stores a value proportional to the last process variable current of the 4 to 20 ma. type signal. When digital communications are completed, the capacitor 34 is switched back into the circuit by the switch 32, and the process variable (PV) current transmission is restored with minimal settling time of the system.

The following is a detailed list of the circuit components used in a preferred construction of the illustrated example of the present invention as shown in FIGS. 5 and 7:

| CPU 10, 22 | RCA | Type 1802 |
|---|---|---|
| UART 12, 23 | RCA | Type 1854 |
| R1 | 30K ohms | |
| R2, R5, R6 | 10K ohms | |
| R3 | 20K ohms | |
| R4 | 124 ohms | |
| R7 | 312 ohms | |
| R8 | 1K ohms | |
| R9, R11 | 250 ohms | |
| R10 | 750 ohms | |
| R12 | 100 ohms | |
| R12 | 100 ohms | |
| R13 | 1 M ohms | |

| -continued | | |
|---|---|---|
| D₁, D₂ | 1N4004 | |
| C₁ | .01 μf | |
| C₂ | .47 μf | |
| C₃ | .0047 μf | |
| C₃₄ | 2 μmf | |
| Amp 16, 18 | ICL 7641 | Intersil |
| NAND 14, 20 | Type 4011 | RCA |
| Exclusive OR 28 | Type 4030 | RCA |
| +V | 5V in series with 62 ohms | |
| FET 1 | VN98 | Intersil |

Figure 9:
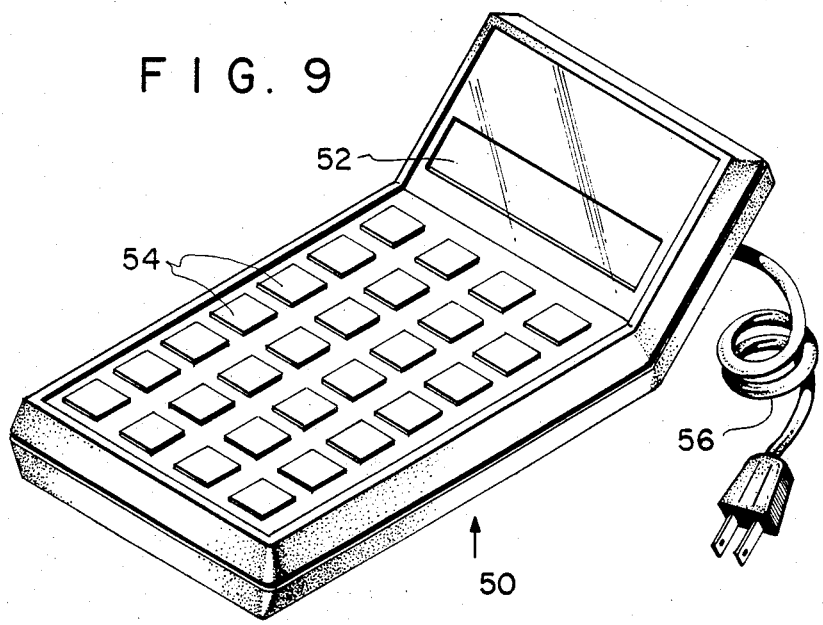
FIG. 9 is a pictorial representation of an example of a communication device.
Figure 11:
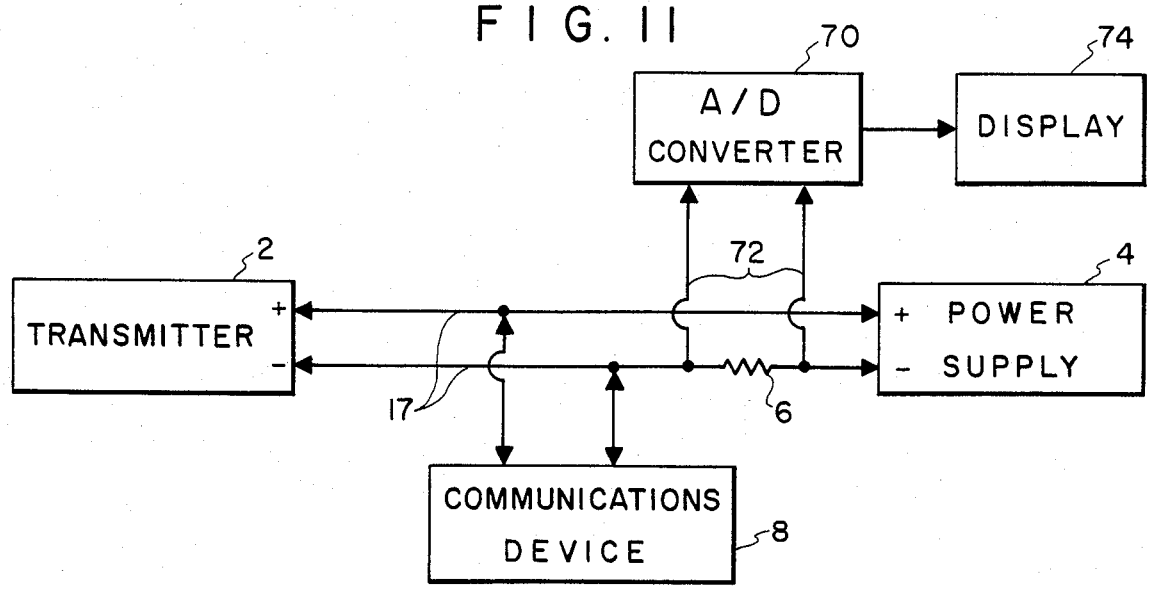
FIG. 11 is an expanded block diagram of the system shown in FIG. 1.

As shown in FIG. 8, the communications device 8 may include a keyboard 42 for supplying digital signals to the CPU 10. Such digital signals and other digital data including stored programs may be stored in memory devices such as a RAM 42 and a ROM 44. The CPU 10 may also be arranged to operate a display 46 for displaying digital signals present during its operation. A pictorial representation of a communications device 8 is shown in FIG. 9. As shown in the communications device 8 includes a hand held-housing 50 having a display window 52 and selectively operable pushbuttons 54. The housing includes a connection cable 56 which is arranged to be selectively connected to the communication lines 17 shown in FIG. 1. The elements discussed above with respect to FIGS. 5 and 8 would be found within the housing 50 to form the communications device 8. As shown in FIG. 10, the transmitter 2 would include memory sources such as a ROM 60 and a RAM 62 for the CPU 22. The storage devices may include digital data received over the communication line 17 as well as prestored programs and data to be used by the CPU 22. An external input to the CPU 22 includes a sensor 64 arrangd to sense a process variable to be monitored and an A to D converter 66 for converting analog output of the sensor to a digital signal suitable for application to the CPU 22. A clock source 68 is arranged to synchronize the operation of the CPU 22 and the UART 23. In FIG. 11, there is shown an expanded representation of the communication system shown in FIG. 1 to include an output representative of the analog signals developed across the resistor 6 in the communication lines 17. This analog signal is applied to and A to D converter over input lines connected across the resistor 6. The output of the A to D converter 70 is applied to subsequent utilization devices such as display 74. Thus, the communication of the analog signal is effected over the same lines used to supply power from the power supply 4 to the transmitter 2 and the communication device 8.

This method of implementing a 4 to 20 ma. communications link for sending either analog process variable signals or digital signals utilizing the signalling protocols and circuits described herein presents a cost effective and inherently more accurate and simplified method for interfacing a microprocessor based sensing instrument to a communication device 8. Such a system by adding the digital communication capability upgrades the conventional analog 4 to 20 ma. systems, which are limited by their analog nature to 0.1% accuracy, to systems, which by virtue of their added capabilities, provide computation and control accuracy limited only by the digital accuracy resolution of the sensor being monitored by the transmitter 2.

Accordingly, it may be seen, that there has been provided, in accordance with the present invention, an improved communication system having analog and digital signal transmission capabilities.

The embodiments of the invention in which an exclusive property or privilege is claimed are defined as follows:

1. A data communication system comprising
a direct current power supply;
a power supply current carrying circuit means connected to said power supply supply for distributing a direct current output from said power supply,
a data transmitting means connected to said current carrying circuit for producing first direct current variations in said direct current from said power supply supplied to said circuit representative of analog data, and second direct current variations in said direct current from said power supply supplied to said current circuit representative of digital data, said first and second current variations being alternate operations and
data receiving means connected to said circuit for receiving said first and second current variations as representations of analog and digital data, respectively.

2. A data communication system as set forth in claim 1 wherein said first current variations are each a current value representative of a corresponding analog data quantity and said second current variations are each a variation between preset current limits to represent a corresponding digital bit.

3. A communication system as set forth in claim 2 wherein said first and second current variations are between the same current limits.

4. A communication system as set forth in claim 1 wherein said transmitting means is connected across said circuit to receive power therefrom.

5. A communication system as set forth in claim 1 wherein said first current variations are separated by a fixed time from said second current variations.

6. A communication system as set forth in claim 1 wherein said circuit includes a fixed resistor for introducing voltage drops thereacross in response to said first and second current variations.

7. A communication system as set forth in claim 6 wherein said receiving means includes means connected across said resistor for receiving said first current variations.

8. A communication system comprising
a direct current power supply;
a power supply current carrying circuit means connected to said power supply for distributing a direct current output from said power supply;
data transmitting means connected to said current carrying circuit for producing first direct current variations in said direct current from said power supply supplied to said circuit representative of analog data and second direct current variations in said direct current from said power supply supplied to said current circuit representative of digital data, said first and second current variations being alternate operations and
data receiving means connected to said circuit for receiving said first and second current variations as representations of analog and digital data, respectively, wherein said transmitting means includes a second receiving means and said first-mentioned receiving means includes a second transmitting means for introducing said second current variations in said circuit for reception by said second receiving means.

9. A method for alternate digital and analog data communication comprising the steps of introducing into a direct current power supply circuit first direct current variations having peak values representative of corresponding analog data, terminating the first current variations, introducing second direct current variations into the power supply circuit having a variation between pre-set current limits with each variation representing a digital bit, and terminating the second current variations by introducing a pre-set gap represented by a fixed pre-set current level.

10. A method as set forth in claim 9 wherein multiple bytes of digital bits are transmitted by having a gap less than the preset gap between bytes.

11. A method as set forth in claim 9 and further including the step of reinstating the first current variations following the pre-set delay.

12. A method as set forth in claim 10 wherein the first current variations are followed by a single current variation of 16 mA added to the last peak value of the preceeding first current variations.

13. A method as set forth in claim 11 wherein said second current variations are preceded by a single direct current variation between the preset current limits.

14. A method as set forth in claim 1 wherein a group of adjacent digital bits represents a byte of digital information and wherein each byte of digital bits is preceded by a single direct current variation between the pre-set limits.

15. A data comunication system as set forth in claim 1 wherein said current circuit includes a pair of electrically conductive wires connected to said power supply and said transmitting means and said receiving means are each arranged to be connected across said pair of wires to establish a communication link therebetween.

16. A data communication system as set forth in claim 15 wherein said current circuit includes a fixed resistor connected in series with one of said wires and located between said power supply and the connections of said transmitting means and said receiving means to said wires.

15. A data communication system comprising
a direct current power supply;
a power supply current carrying circuit means connected to said power supply for distributing a direct current output from said power supply;
data transmitting means connected to said current carrying circuit for producing first direct current variations in said direct current from said power supply supplied to said circuit representative of analog data and second direct current variations in said direct current from said power supply supplied to said current circuit representative of digital data, said first and second current variations being alternate operations and
data receiving means connected to said circuit for receiving said first and second current variations as representations of analog and digital data, respectively, wherein said current circuit includes, a pair of electrically conductive wires connected to said power supply for receiving said direct current output and said transmitting means and said receiving means are each arranged to be connected across said pair of wires to establish a communication link therebetween.

17. A data communication system as set forth in claim 1 wherein said transmitting means and said receiving means each include a random access memory for storing the digital data used for producing said second power supply variations.

18. A data communication system as set forth in claim 1 wherein said data transmitting means includes a process variable sensor means and means for converting an output signal from said sensor means into said first current variations for transmission on said current circuit.

19. A data communication system as set forth in claim 1 wherein said receiving means includes a display means for producing a visual representation of said first current variations.

20. A data communication system as set forth in claim 19 wherein said receiving means includes a display means for producing a visual representation of said second current variations.

* * * * *